United States Patent
Blankenship et al.

(10) Patent No.: US 7,432,325 B2
(45) Date of Patent: Oct. 7, 2008

(54) NONIONIC ASSOCIATIVE THICKENER CONTAINING CONDENSATION POLYMER BACKBONE

(75) Inventors: Robert Mitchell Blankenship, Harleysville, PA (US); Barrett Richard Bobsein, Sellersville, PA (US); Lifeng Zhang, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 469 days.

(21) Appl. No.: 10/989,202

(22) Filed: Nov. 15, 2004

(65) Prior Publication Data

US 2006/0106153 A1 May 18, 2006

(51) Int. Cl.
*C08L 75/00* (2006.01)

(52) U.S. Cl. .................. 524/589; 524/500; 528/44; 528/421

(58) Field of Classification Search ............ 524/500, 524/589; 528/44, 421
See application file for complete search history.

(56) References Cited

U.S. PATENT DOCUMENTS

| | | | |
|---|---|---|---|
| 4,327,008 A | 4/1982 | Schimmel et al. | |
| 5,140,099 A | 8/1992 | Bostrom et al. | |
| 5,496,908 A | 3/1996 | Bostrom et al. | |
| 5,728,895 A | 3/1998 | Wiggins et al. | |

FOREIGN PATENT DOCUMENTS

| | | |
|---|---|---|
| EP | 0 151 748 A | 8/1985 |
| EP | 1 038 892 A | 9/2000 |
| WO | WO 02/12363 A | 2/2002 |

OTHER PUBLICATIONS

Jannasch, P., "Preparation and Characterisation of Aggregating Comblike Poly (propylene oxide)", *Polymer*, Elsevier Science Publishers B.V., GB, vol. 41, No. 18, pp. 6701-6707, (Aug. 2000).

Jannasch, P., "Phase Behavior and Ion Conductivity of Electrolytes Based on Aggregating Combshaped Polyethers", *Electrochimica Acta*, Elsevier Science Publishers, Barking, GB, vol. 46, No. 10-11, pp. 1641-1649, (Mar. 2001).

*Primary Examiner*—Edward J Cain

(57) ABSTRACT

Nonionic associative thickeners are provided having a nonionic water soluble polymer backbone with at least two pendant polymeric chains attached to the nonionic water soluble polymer backbone. The pendant polymeric chains have terminal chain segments containing polyoxyalkylene units comprising 3 to 6 carbon atoms. The nonionic associative thickeners are useful for modifying the rheology of compositions including aqueous compositions, such as latex containing compositions.

10 Claims, No Drawings

NONIONIC ASSOCIATIVE THICKENER CONTAINING CONDENSATION POLYMER BACKBONE

This invention generally relates to a nonionic associative thickener. In particular, the present invention relates to a nonionic associative thickener having a nonionic water soluble polymer backbone containing condensation polymer. The nonionic water soluble polymer backbone has at least two pendant polymeric chains attached thereto. The pendant polymeric chains have terminal chain segments. The nonionic associative thickener is useful for modifying the rheology of various compositions, including water based latex compositions, such as paints, adhesives, and paper coating compositions.

In the formulation of aqueous latex paints, a desired balance between high and low shear viscosities is sought to provide satisfactory applications properties, such as by spraying or brushing; satisfactory leveling of the applied wet paint film; and minimal sagging of the applied wet paint film. Aqueous latex paints are commonly formulated with various viscosity modifying additives, often referred to as flow modifiers, viscosity modifiers, rheology modifiers, or thickeners, to balance the high and low shear flow properties of the aqueous latex paint. Examples of viscosity modifying additives include cellulosic materials such as hydroxyethyl cellulose; alkali soluble emulsions; associative thickeners; and ionic polymers. Typically, blends of viscosity modifying additives are employed to obtain the appropriate balance of high and low shear viscosities.

Associative thickeners are water-soluble or water-swellable polymers that have chemically attached hydrophobic groups. The associative thickeners operate to thicken systems to which they are added by non-specific associations, such as adsorption on surfaces or aggregation in solution akin to micellization, between the hydrophobic groups on the thickener molecules and moieties on the other components in the system, similar to the non-specific associations of conventional surfactants.

One problem in aqueous latex paints containing associative thickeners is a decrease in the paint viscosity with increasing temperature. As these paints are formulated to a desired viscosity for application at a typical temperature range, such as, for example, a temperature range of 15-30° C., this decreased viscosity at higher temperatures leads to diminished application properties, such as increased dripping and sagging of the applied paint. Further, higher temperatures are often encountered during the storage or shipping of the paint. This may lead to increased settling of the dispersed inorganic pigment or inorganic fillers as a result of increased sedimentation of the pigment or filler particles in a paint having lower viscosity.

U.S. Pat. No. 4,327,008 discloses a rheology modifier having branched structure, urea linkages, and terminal hydrophobe groups. The rheology modifier is prepared from polyalkylene oxide, a polyfunctional material, a diisocyanate, water, and sufficient monofunctional active hydrogen-containing compound or monoisocyanate to end cap free isocyanate or hydroxy groups. The reference discloses that polyalkylene oxides used in the preparation of the rheology modifier include polyethylene oxide diols, polypropylene oxide diols, and polybutylene oxide diols. The disclosed rheology modifiers are useful in water-based as well as organic solvent-based compositions.

Desired are associative thickeners with thickening efficiencies that do not decrease with increased temperature, such as a change in temperature from 25° C. to a temperature in the range of 40-50° C.

This invention, among other things, is a nonionic associative thickener comprising a nonionic water soluble polymer backbone comprising a condensation polymer; and at least two pendant polymeric chains attached to the nonionic water soluble polymer backbone; wherein each of the pendant polymeric chains comprise a terminal chain segment selected from:

$$D\text{-}(L)_n\text{-}(AO)_x\text{-}(L)_n\text{-}, \qquad \qquad \text{i)}$$

$$D\text{-}(L)_n\text{-}(EO)_q\text{-}(L)_n\text{-}(AO)_x\text{-}(L)_n\text{- or} \qquad \text{ii)}$$

$$D\text{-}(L)_n\text{-co}[(AO)_w(EO)_z]\text{-}(AO)\text{-}(L)_n\text{-} \qquad \text{iii)}$$

where: D is a hydrophobe comprising from 1 to about 24 carbon atoms; L is a linker group; EO is an oxyethylene unit; AO is an oxyalkylene unit comprising from 3 to 6 carbon atoms; $co[(AO)_w(EO)_z]$ is a copolymer comprising the AO and the EO; each n is independently selected from zero or 1; w is an integer in the range of from 3 to about 150; x is an integer in the range of from 4 to about 150; q is an integer in the range of from 1 to about 30; z is an integer in the range of from 1 to w; q is less than x; and wherein the nonionic associative thickener has a weight average molecular weight of at least 10,000.

Provided is a composition comprising:
I) a nonionic associative thickener comprising: a nonionic water soluble polymer backbone comprising a condensation polymer; and at least two pendant polymeric chains attached to said nonionic water soluble polymer backbone; wherein each of said pendant polymeric chains comprise a terminal chain segment selected from:

$$D\text{-}(L)_n\text{-}(AO)_x\text{-}(L)_n\text{-}, \qquad \qquad \text{i)}$$

$$D\text{-}(L)_n\text{-}(EO)_q\text{-}(L)_n\text{-}(AO)_x\text{-}(L)_n\text{- or} \qquad \text{ii)}$$

$$D\text{-}(L)_n\text{-co}[(AO)_w(EO)_z]\text{-}(AO)\text{-}(L)_n\text{-} \qquad \text{iii)}$$

where: D is a hydrophobe comprising from 1 to about 24 carbon atoms; L is a linker group; EO is an oxyethylene unit; AO is an oxyalkylene unit comprising from 3 to 6 carbon atoms; $co[(AO)_w(EO)_z]$ is a copolymer comprising said AO and said EO; each n is independently selected from zero or 1; w is an integer in the range of from 3 to about 150; x is an integer in the range of from 4 to about 150; q is an integer in the range of from 1 to about 30; z is an integer in the range of from 1 to w; q is less than x; and wherein said nonionic associative thickener has a weight average molecular weight of at least 10,000; and
II) at least one material selected from extender, pigment, or colorant.

Also provided is a method of thickening a composition comprising the step of: adding a nonionic associative thickener to the aqueous composition, wherein the nonionic associative thickener comprises:
a) a nonionic water soluble polymer backbone comprising a condensation polymer; and
b) at least two pendant polymeric chains attached to the nonionic water soluble polymer backbone;

wherein each of the pendant polymeric chains comprise a terminal chain segment selected from:

$$D\text{-}(L)_n\text{-}(AO)_x\text{-}(L)_n\text{-}, \qquad \qquad \text{i)}$$

$$D\text{-}(L)_n\text{-}(EO)_q\text{-}(L)_n\text{-}(AO)_x\text{-}(L)_n\text{- or} \qquad \text{ii)}$$

$$D\text{-}(L)_n\text{-co}[(AO)_w(EO)_z]\text{-}(AO)\text{-}(L)_n\text{-} \qquad \text{iii)}$$

where: D is a hydrophobe comprising from 1 to about 24 carbon atoms; L is a linker group; EO is an oxyethylene unit; AO is an oxyalkylene unit comprising from 3 to 6 carbon atoms; co[(AO)$_w$(EO)$_z$] is a copolymer comprising the AO and the EO; each n is independently selected from zero or 1; w is an integer in the range of from 3 to about 150; x is an integer in the range of from 4 to about 150; q is an integer in the range of from 1 to about 30; z is an integer in the range of from 1 to w; q is less than x; and wherein the nonionic associative thickener has a weight average molecular weight of at least 10,000.

As used herein, "KU" refers to Krebs unit and is a measure of the mid-shear viscosity as measured by a Kreb-Stormer viscometer.

As used herein, "viscosity stability" refers to the ability of a composition to resist change in viscosity as measured by KU upon the addition of surfactant or a composition containing surfactant, such as a colorant. Colorants are added to paints in units of milliliter of colorant per liter of paint (referred to as ml/l) or in units of ounces of colorant per gallon of paint (referred to as "oz/gal"). A preferred viscosity stabilizer for latex paints provides KU viscosity changes of less than about 10 KU upon the addition of up to 94 ml/l (12 oz/gal) of colorant. A more preferred viscosity stabilizer for latex paint provides KU viscosity changes of less than about 5 units upon the addition of up to 94 ml/l of colorant.

As used herein, the term "aqueous composition" refers to a composition that is provided predominantly in water rather than organic solvent. It is contemplated, however, that a minor amount of organic solvent may be included in the composition and that the composition will nonetheless be an "aqueous composition".

As used herein, the term "oxyalkylene" refers to units having the structure:

—(O—R)—, where R is an alkylene group. Examples of oxyalkylenes include, but are not limited to:
  oxyethylene with the structure —(OCH$_2$CH$_2$)—;
  oxypropylene with the structure —(OCH(CH$_3$)CH$_2$)—;
  oxybutylene with the general structure —(OC$_4$H$_8$)—;
  oxypentylene with the general structure —(OC$_5$H$_{10}$)—; and
  oxyhexylene with the general structure —(OC$_6$H$_{12}$)—.

Polymers containing these units are referred to as "polyoxyalkylenes". Examples of homopolymers of polyoxyalkylenes include, but are not limited to:
  polyoxyethylene, which contains units of oxyethylene;
  polyoxypropylene, which contains units of oxypropylene; and
  polyoxybutylene, which contains units of oxybutylene.

Examples of polyoxybutylene include a homopolymer containing units of 1,2-oxybutylene, —(OCH(C$_2$H$_5$)CH$_2$)—; and polytetrahydrofuran, a homopolymer containing units of 1,4-oxybutylene, —(OCH$_2$CH$_2$CH$_2$CH$_2$)—. Alternatively, the polyoxyalkylenes may be copolymers containing two or more different oxyalkylene units. The different oxyalkylene units may be arranged randomly to form a random polyoxyalkylene polymer; or may be arranged in blocks to form a block polyoxyalkylene polymer. Block polyoxyalkylene polymers have two or more neighboring polymer blocks, wherein a polymer block contains at least two of the same oxyalkylene units, and a neighboring block contains different oxyalkylene units.

Condensation polymers are polymers formed from the reaction of monomers containing one or more functional groups, wherein at least one of the reacted functional groups is not an ethylenic unsaturation. The reaction may occur between monomers having the same functional group, such as an epoxy group; or between monomers having different functional groups, such as between a monomer having a hydroxy group and another monomer having an isocyanate group. Preferably, the condensation polymer is formed from the reaction of monomers containing one or more functional groups, wherein the functional groups are not ethylenic unsaturations. The reaction of the one or more functional groups results in the formation of a linkage group, such as, for example, a urethane group. Examples of suitable functional groups include, but are not limited to isocyanates, hydroxy groups, amine groups, epoxy groups, acid groups such as carboxylic acid groups, and halogen groups such as chloride groups. Linkage groups formed by the reaction of the one or more functional groups include, but are not limited to ethers, urethanes, amides, esters, ureas, and carbonates. Examples of condensation polymers include, but are not limited to, polyurethanes, polyureas, polyesters, polyethers, aminoplastether polymers, and polycarbonates. As used herein, the term "condensation polymer" expressly excludes vinyl addition polymers.

The nonionic associative thickener of the present invention has a nonionic water soluble polymer backbone and at least two pendant polymeric chains attached thereto. Each of the pendant polymeric chains have a terminal chain segment that is terminated by a hydrophobe group. The nonionic associative thickener of this invention has a nonionic water soluble polymer backbone that contains a condensation polymer.

The nonionic water soluble polymer backbone is formed by the polymerization of monomer units. Suitable configurations for the nonionic water soluble polymer backbone include linear, branched, star-shaped, comb-shaped, and complex shapes such as a crosslinked polymer. The nonionic water soluble polymer backbone has an aqueous solubility of at least 1% by weight at a temperature of 25° C. The solubility of the nonionic water soluble polymer backbone is determined without the attached pendant polymeric chains. Further, the nonionic water soluble polymer is substantially free of ionic groups. As used herein, "substantially free of ionic groups" means less than 5 equivalent % ionic groups, preferably less than 2 equivalent % ionic groups, and more preferably, less than 1 equivalent % ionic groups, based on equivalents of monomers used to prepare the nonionic water soluble polymer. Ionic groups are groups capable of ionizing in water at a pH in the range of from 2 to 12. Typically, the nonionic water soluble polymer backbone has a weight average molecular weight of at least 10,000, preferably at least 20,000, and more preferably, at least 30,000. Suitable ranges for the weight average molecular weight of the nonionic water soluble polymer backbone include 10,000 to 500,000, preferably 20,000 to 200,000, and more preferably 30,000 to 100,000. All values of the weight average molecular weight (referred to herein as "M$_w$") used herein are determined by size exclusion chromatography (referred to herein as "SEC") as described herein below.

The nonionic associative thickener has at least two pendant polymeric chains attached to the nonionic water soluble polymer backbone. Each of the pendant polymeric chains is attached as a sidechain to the nonionic water soluble polymer backbone, or as an endgroup at a terminal position of the nonionic water soluble polymer backbone. The pendant polymeric chains are attached by linkage groups to the nonionic water soluble polymer backbone. Each of the pendant polymeric chains also have a terminal chain segment, which is the nonattached end of the pendant polymeric chain. The pendant polymeric chains may be linear or branched. A linear pendant polymeric chain has one terminal chain segment. A branched pendant polymeric chain has one or more terminal chain segments, and optionally, other terminal groups that are not the terminal chain segments.

The terminal chain segment of the pendant polymeric chain has an polyoxyalkylene segment attached by a linkage to the hydrophobe group. The polyoxyalkylene segment includes a polyoxyalkylene chain containing $C_3$ to $C_6$ oxyalkylene units. The hydrophobe group contains 1 to about 24 carbon atoms. Suitable hydrophobe groups include $C_1$ to $C_{24}$ alkyl groups and $C_1$ to $C_{24}$ alkylaryl groups. The $C_1$ to $C_{24}$ alkyl groups or the $C_1$ to $C_{24}$ arylalkyl groups may be linear, branched, or cyclic. Further, the $C_1$ to $C_{24}$ alkyl groups or the $C_1$ to $C_{24}$ alkylaryl groups may be substituted. Examples of suitable alkyl groups include, but are not limited to, methyl, ethyl, propyl, butyl, hexyl, octyl, decyl, undecyl, dodecyl, tridecyl, 2-butyl-1-octyl, and stearyl. Examples of suitable alkylaryl groups include, but are not limited to, alkylphenol, nonylphenol, and acetylphenol. In one non-limiting embodiment, the hydrophobe group is selected from $C_1$ to $C_{18}$ alkyl groups. In a different non-limiting embodiment, the hydrophobe group is selected from $C_8$ to $C_{18}$ alkyl groups.

The weight average molecular weight of the nonionic associative thickeners are typically in the range of 10,000 to 500,000, preferably in the range of from 20,000 to 200,000, and more preferably in the range of from 30,000 to 100,000.

The nonionic associative thickeners of the present invention contain two or more attached pendant polymeric chains, wherein each of the pendant polymeric chains have a terminal chain segment selected from A.1, A.2, or A.3.

$$D\text{-}(L)_n\text{-}(AO)_x\text{-}(L)_n\text{-} \quad\quad A.1$$

wherein:

D is a hydrophobe containing from 1 to about 24 carbon atoms, preferably from 1 to about 18 carbon atoms, and more preferably from about 6 to about 18 carbon atoms;

L is a linker group;

AO is an oxyalkylene unit containing from 3 to 6 carbon atoms, preferably 3 to 4 carbon atoms, and more preferably 3 carbon atoms;

each n is independently selected from zero or 1; and x is an integer in the range of from 4 to about 150, preferably in the range of from about 10 to about 100; and more preferably in the range of from about 15 to about 50.

$$D\text{-}(L)_n\text{-}(EO)_q\text{-}(L)_n\text{-}(AO)_x\text{-}(L)_n\text{-} \quad\quad A.2$$

wherein:

D is a hydrophobe containing from 1 to about 24 carbon atoms, preferably from 1 to about 18 carbon atoms, and more preferably from about 6 to about 18 carbon atoms;

L is a linker group;

EO is an oxyethylene unit;

AO is an oxyalkylene unit containing from 3 to 6 carbon atoms, preferably 3 to 4 carbon atoms, and more preferably 3 carbon atoms;

each n is independently selected from zero or 1;

x is an integer in the range of from 4 to about 150, preferably in the range of from about 10 to about 100; and more preferably in the range of from about 15 to about 50;

q is an integer in the range of from 1 to about 30, preferably in the range of from 1 to about 20, and more preferably in the range of from 1 to about 10; and q is less than x.

$$D\text{-}(L)_n\text{-co }[(AO)_w(EO)_z]\text{-}(AO)\text{-}(L)_n\text{-} \quad\quad A.3$$

wherein:

D is a hydrophobe containing from 1 to about 24 carbon atoms, preferably from 1 to about 18 carbon atoms, and more preferably from about 6 to about 18 carbon atoms;

L is a linker group;

EO is an oxyethylene unit;

AO is an oxyalkylene unit containing from 3 to 6 carbon atoms, preferably 3 to 4 carbon atoms, and more preferably 3 carbon atoms;

co$[(AO)_w(EO)_z]$ is a copolymer containing the AO and the EO;

each n is independently selected from zero or 1;

w is an integer in the range of from 3 to about 150, preferably in the range of from about 10 to about 100; and more preferably in the range of from about 15 to about 50; and z is an integer in the range of from 1 to w.

In the structures represented in A.1-3, a value of n equal to zero indicates that an oxygen atom forms the linkage. For example, in the terminal chain segment having the composition $C_8H_{17}O(C_3H_6O)_{39}C_3H_6O$—, an oxygen atom forms an ether linkage between the hydrophobe (D) and the polyoxyalkylene chain $(AO)_{40}$. The value of n equal to one indicates that linkage group containing heteroatoms, such as a urethane or urea linkage. For example, in the terminal chain segment having the composition, $C_8H_{17}NH(CO)O(C_3H_6O)_{39}C_3H_6O(CO)NH$—, urethane linkages connect the hydrophobe to the polyoxypropylene chain, and the polyoxypropylene chain to the polymer backbone.

The nonionic associative thickeners have nonionic water soluble polymer backbones that are condensation polymers. These polymer backbones may be linear or branched. Examples of suitable condensation polymers for providing the polymer backbone include, but are not limited to, polyurethane polymers, polyether polymers, polysaccharide polymers, polyamide polymers, polyurea polymers, polyester polymers, and aminoplast-ether polymers. Preferably, the nonionic water soluble condensation polymer backbone is a polyurethane polymer, a polyether polymer, or an aminoplast-ether polymer.

The nonionic associative thickeners of this invention may be prepared by various polymer methods known in the art, such as polymerization in an organic solvent, bulk polymerization, and nonaqueous emulsion polymerization. One or more catalysts may be included in the reaction process. The polymerization process may be a batch, semi-continuous, or continuous process. After preparation, the nonionic associative thickeners of Group A may be solubilized or dispersed into an aqueous medium. The preparation of condensation polymers are disclosed in U.S. Pat. No. 4,079,028; U.S. Pat. No. 4,327,008; U.S. Pat. No. 4,411,819; U.S. Pat. No. 4,426,485; U.S. Pat. No. 4,499,233; U.S. Pat. No. 5,023,309; U.S. Pat. No. 5,496,908; U.S. Pat. No. 5,527,232; U.S. Pat. No. 5,574,127; U.S. Pat. No. 5,728,895; and WO 01/12712 A1.

In one non-limiting embodiment, the nonionic water soluble polymer backbone of the nonionic associative thickener is a polyurethane polymer. The polyurethane polymer is formed by the reaction of water soluble polyether polyols and organic polyisocyanates. Optionally, polyhydric alcohols are included in the reaction to prepare the polyurethane polymer. Polyhydric alcohols having three or more hydroxyl groups may be reacted to provide branching in the nonionic water soluble polymer backbone. Examples of suitable polyhydric alcohols include, trimethylolpropane, pentaerythritol, and dipentaerythritol. Alternatively, branching may be provided by the use of polyisocyanates having three or more isocyanate groups, or polyether polyols having three or more hydroxyl groups. The water soluble polyether polyols used in the polymerization of the polyurethane backbone polymer may be adducts of an aliphatic, a cycloaliphatic, or an aromatic polyhydroxy compound such as a polyhydric alcohol or polyhydric alcohol ether and an alkylene oxide such as ethylene oxide. Alternatively, the water soluble polyether polyols may be hydroxyl-terminated prepolymers of such adducts and an organic polyisocyanate. The adducts or prepolymers may be mixtures of two or more such adducts or prepolymers, and mixtures of such adducts with prepolymers may also be used. The polyhydric alcohols include not only the simple glycols such as ethylene glycol but also hydroxy compounds containing three or more hydroxyl groups, such as polyalkylolalkanes and polyhydroxyalkanes. Examples of polyalkylolalkanes include trimethyolpropane, and pentaerythritol. Examples of polyhydroxyalkanes include glycerol, erythritol, sorbitol, and mannitol. The polyhydric alcohol ethers are commonly adducts of polyhydric alcohols and alkylene oxides but in some cases are present as byproducts with other polyhydroxy compounds. For example, pentaerythritol as ordinarily prepared contains about 15 weight % of the ether, dipentaerythritol. Examples of cycloaliphatic polyhydric compounds include 1,2-cyclopentanediol, 1,4-cyclohexanediol, and hexahydroxycyclohexane. The polyhydroxy compounds also include aromatic compounds such as di- and trihydroxy benzene.

One source of the polyether polyol adducts is a polyoxyalkylene such as polyoxyethylene with a weight average molecular weight in the range of from about 4,000 to about 20,000. Optionally, the water soluble polymer backbone may contain units of other oxyalkylenes such as propylene oxide, provided that the water soluble polymer backbone has an aqueous solubility as defined hereinabove. However, adducts of an alkylene oxide and a monofunctional reactant such as a fatty alcohol, a phenol, or an amine; or adducts of an alkylene oxide and a difunctional reactant such as an alkenolamine such as ethanolamine are also useful. Such adducts are also known as diol ethers and alkanolamine ethers. p The organic polyisocyanates, or isocyanates used to form the polyurethane backbone polymer may be aliphatic, cycloaliphatic, or aromatic; and may be used singularly or in admixture of two or more, including mixtures of isomers. Examples of suitable organic polyisocyanates include: 1,4-tetramethylene diisocyanate, 1,6-hexamethylene diisocyanate, 2,2,4-trimethyl-1,6-diisocynatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate. Other suitable organic polyisocyanates include aliphatic triisocyanate product of the hydrolytic trimerization of 1,6-hexamethylene diisocyanate, sold under the tradename "Desmodur™ N" by Bayer Corp., Germany, and aromatic triisocyanate adduct of trimethylol propane and toluene diisocyanate, sold under the tradename "Mondur™ CB-75" by Bayer Corp., Germany.

In the nonionic associative thickener of the present non-limiting embodiment, the pendant polymeric chains are typically provided by attaching reactive surfactant to the polymer backbone. The reactive surfactant has a polyoxyalkylene chain with a hydrophobe group at one terminus of the polyoxyalkylene chain and a reactive group at the second terminus of the polyoxyalkylene chain. The polyoxyalkylene chain of the reactive surfactant contains from 4 to about 150 oxyalkylene units having at least 3 to 6 carbon atoms each. Preferably, the oxyalkylene units are oxypropylene. The polyoxyalkylene chain optionally contains block oxyethylene units, provided that the number of oxyethylene units in the terminal chain segment adjacent to the hydrophobe is in the range of zero to about 30 and further that the number of oxyethylene units is less than the number of polyoxyalkylene units having at least 3 to 6 carbon atoms. Examples of suitable reactive groups include hydroxyl groups, isocyanate groups, amine groups, and epoxy groups. The associative thickener may be provided by including the reactive surfactants in the reaction to form the polyurethane polymer, or alternatively, by reacting the reactive surfactants with isocyanate groups or hydroxyl groups attached to the polyurethane polymer in a separate reaction step.

Suitable reactive surfactants include groups having the formulas I, II, or III.

$$D\text{-}(L)_n\text{-}(AO)_x\text{-}(RG) \qquad (I)$$

wherein D is a hydrophobe containing from 1 to about 24 carbon atoms; L is a linker group; RG is a reactive group; AO is an oxyalkylene unit containing from 3 to 6 carbon atoms; n is independently selected from zero or 1; and x is an integer in the range of from 4 to about 150, preferably in the range of from about 15 to about 30.

$$D\text{-}(L)_n\text{-}(EO)_q\text{-}(L)_n\text{-}(AO)_x\text{-}(RG) \qquad (II)$$

wherein D is a hydrophobe containing from 1 to about 24 carbon atoms; L is a linker group; RG is a reactive group; EO is an oxyethylene unit; AO is an oxyalkylene unit containing from 3 to 6 carbon atoms; each n is independently selected from zero or 1; x is an integer in the range of from 4 to about 150, preferably in the range of from about 15 to about 30; q is an integer in the range of from 1 to about 30; and q is less than x.

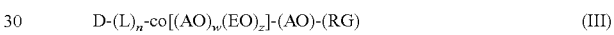

$$D\text{-}(L)_n\text{-}co[(AO)_w(EO)_z]\text{-}(AO)\text{-}(RG) \qquad (III)$$

wherein D is a hydrophobe containing from 1 to about 24 carbon atoms; L is a linker group; RG is a reactive group; EO is an oxyethylene unit; AO is an oxyalkylene unit containing from 3 to 6 carbon atoms; $co[(AO)_w(EO)_z]$ is a copolymer containing the AO and the EO; n is independently selected from zero or 1; w is an integer in the range of from 3 to about 150, preferably in the range of from about 15 to about 30; z is an integer in the range of from 1 to w.

Suitable reactive groups, RG, for reacting with an isocyanate group, include hydroxyl groups or amine groups. Suitable reactive groups, RG, for reacting with an alcohol group, include isocyanate groups, epoxide groups, or carboxylic acid groups.

Preferably, the hydrophobe group, D, contains from 1 to about 18 carbon atoms. More preferably, the hydrophobe group, D, is an alkyl group. Examples of suitable hydrophobe groups include butyl, hexyl, octyl, decyl, undecyl, lauryl, stearyl, tri-decyl, and 2-butyl-1-octyl.

Examples of suitable reactive surfactants include reactive surfactants having hydroxyl groups such as polypropylene glycol monoalkyl ethers such as $R\text{-}(PO)_x\text{-}OH$ wherein PO represents an oxypropylene unit, R is an alkyl group such as butyl or lauryl, and x is in the range of from about 10 to about 30.

Suitable optional catalysts for preparing the nonionic associative thickener having a polyurethane backbone include dibutyltin dilaurate; bismuth octoate; bismuth tris(2-ethyihexanoate); zirconium, cobalt, nickel, manganese, titanium, and zinc dionate complexes, which may be formed from diketone chelating agents; cobalt octoate; zinc octoate; and zinc acetate.

In another non-limiting embodiment, the nonionic water soluble polymer backbone of the nonionic associative thickener is a polyurea polymer. The polyurea polymer is formed by the reaction of water soluble polyether polyamines and organic polyisocyanates. Optionally, polyamines are included in the reaction to prepare the polyurea polymer. Polyamines having three or more amine groups may be reached to provide branching in the nonionic water soluble polymer backbone. Alternatively, branching may be provided by the use of polyisocyanates having three or more isocyanate groups or polyether polyamines having three or more amine groups.

The water soluble polyether polyamines include diamines such as polyoxyethylene diamines having the structure $NH_2(EO)_xNH_2$ with a weight average molecular weight in the range of from about 2,000 to about 20,000.

Other suitable water soluble polyether polymers for preparing a water soluble polymer backbone with urea linkages include water soluble polyoxyethylene amines having the structure $NH_2(EO)_xH$, which reacts with isocyanates to form both a urea linkage as well as a urethane linkage. Suitable water soluble polyoxyethylene amines may have oxyethylene chain lengths in the range of from about 10 to about 200. Examples of such compounds include Jeffamine™ polyoxyalkyleneamines (Huntsman Corporation, Houston, Tex.).

Suitable polyisocyanates are listed herein above in the previous non-limiting embodiment.

The pendant polymeric chains are provided by attaching reactive surfactants to the polymer backbone. The reactive surfactants have a polyoxyalkylene chain with a hydrophobe at one terminus of the polyoxyalkylene chain and a reactive group at the second terminus of the polyoxyalkylene chain. The reactive surfactants are represented by Formulas I, II, and III hereinabove.

In another non-limiting embodiment, the nonionic water soluble polymer backbone of the nonionic associative thickener is a polyether polymer. The polyether polymer may be formed by the reaction of polyoxyethylene and gem-dihalogenated reagent in the presence of a base, as described in U.S. Pat. No. 5,574,127. Optionally, polyhydric alcohols are included in the reaction to prepare the polyether polymer. The polyhydric alcohols having three of more hydroxyl groups may be reacted to provide branching in the nonionic water soluble polymer backbone. The polyhydric alcohols may be polyakylolalkanes or polyhydroxyalkanes. Suitable gem-dihalogenated reagents include dihalogenomethanes, such as dibromomethane and dichloromethane; 1,1-dichlorotoluene, 1,1-dichloroethane, and 1,1-dibromomethane. The pendent polymeric chains are provided by attaching reactive surfactant groups, as disclosed hereinabove, with the polyether polymer. In one method, the reactive surfactants contain terminal hydroxyl groups as the reactive groups. In this method, the reactive surfactants are reacted with the polyether polymer in the presence of gem-dihalogenated reagent. In a different method, the reactive surfactants contain terminal isocyanate groups or epoxy groups, which are reacted with hydroxyl groups on the polyether backbone. Suitable reactive surfactants include, for example, the reactive surfactants of Formulas I, II, and III. In a still different method, the reactive surfactants are reacted with the polyether polymer in the presence of a halogen containing compound. Examples of suitable halogen containing compounds include epihalohydrins, such as epichlorohydrin, epibromohydrin, and epi-iodohydrin; and trihaloalkanes such as 1,2,3-trichloropropane, 1,2,4-trichlorobutane, and 1,3,6-trichlorohexane, as well as trihaloalkanes containing one or more bromine or iodine atoms. The reaction in the presence of the halogen containing compound is typically base catalyzed with, for example, sodium hydroxide or metal alkoxides. Also, when epihalohydrin is used, the residual hydroxyl functionality generated from the reaction of the epihalohydrin, may be further reacted to provide branching or crosslinking to the polyether polymer backbone. One reagent that reacts with this hydroxyl functionality is m-dichloromethyl benzene. In an alternative method, the nonionic associative thickener having a polyether polymer backbone is formed by reacting the reactive surfactant of Formulas I, II, or III with suitable linkers, such as gem-dihalogenated reagents and epihalohydrins. When an epihalohydrin is used, the residual hydroxyl functionality may be reacted further to provide branching, or a higher molecular weight. This method requires a sufficient number of reactive surfactants to be linked to provide a nonionic associative thickener with a molecular weight of at least 10,000.

In a different non-limiting embodiment, the nonionic water soluble polymer backbone of the nonionic associative thickener is a polysaccharide polymer. The nonionic associative thickener of this embodiment is typically formed by attaching the reactive surfactant to the polysaccharide backbone to provide pendant polymeric chains. Examples of suitable polysaccharide polymers include cellulose ethers such as hydroxethyl cellulose, hydroxypropyl cellulose, methyl cellulose, hydroxypropyl methyl cellulose, ethyl hydroxyethyl cellulose, and methyl hydroxyethyl cellulose. The pendant polymeric chains may be attached to the polysaccharide polymer by ether or urethane linkages. Suitable reactive surfactants include, for example, the reactive surfactants of Formulas I, II, and III wherein the reactive group is an alcohol group, a halide group, or an isocyanate group. U.S. Pat. No. 4,228,277 discloses a method to attach hydrophobe containing groups to polysaccharide polymers.

In a still different non-limiting embodiment, the nonionic water soluble polymer backbone of the nonionic associative thickener is a polyamide polymer. The polyamide polymer may be formed by the reaction of water soluble polyether polyamines and polycarboxylic acid compounds. Optionally, polyamines are included in the reaction to prepare the polyamide polymer. Polyamines having three or more amine groups may be reacted to provide branching in the nonionic water soluble polymer backbone. The pendant polymeric chains are provided by attaching the reactive surfactant groups of Formulas I, II, and III with the polyamide polymer. Suitable reactive groups, RG, for reacting with an amine group on the polyamide polymer, include, for example, isocyanates, epoxides, and carboxylic acids. Suitable reactive groups, RG, for reacting with carboxylic acid group include, for example, isocyanates, epoxides, and amide groups.

In a further different non-limiting embodiment, the nonionic water soluble polymer backbone of the nonionic associative thickener is an aminoplast-ether copolymer. The aminoplast-ether copolymer is formed by the reaction of water soluble polyether polyols and aminoplasts. Aminoplasts are compounds prepared by the reaction of an amine compound with an aldehyde. The aminoplast has an amino group bonded to an alkylol, alkylol ester, or ester functional group. The aminoplasts useful for preparing the nonionic associative thickener of this non-limiting embodiment contain at least two amino groups bonded to alkylols, alkylol esters, or ester functional groups. Examples of suitable amine compounds include melamine, benzoguanamine, dihydroxyethylene urea, and glycoluril. Other suitable aminoplasts are disclosed in U.S. Pat. No. 6,627,232. The nonionic associative thickener of this embodiment is typically formed by attaching the reactive surfactant to the aminoplast polymer backbone to provide pendant polymeric chains. The pedant polymeric chains may be attached to the aminoplast polymer by ether linkages. Suitable reactive surfactants include, for example, the reactive surfactants of Formula I, II, and III wherein the reactive group is a hydroxyl group. It is also contemplated that reactive surfactants may be linked together by suitable multifunctional aminoplasts to form the nonionic associative thickener having an aminoplast-ether copolymer backbone.

The nonionic associative thickener of this invention may be provided as an aqueous thickener composition containing the nonionic associative thickener and an aqueous medium. The aqueous thickener composition may contain the nonionic associative thickener at an amount in the range of from about 0.1 to about 40 weight %, preferably in the range of from about 5 to about 30 weight %, and more preferably in the range of from about 10 to about 20 weight %, based on the weight of the aqueous thickener composition. The aqueous medium is predominately water, and optionally contains water miscible solvents, such as ethanol, propanol, and glycol ethers. Preferably the aqueous thickener composition is provided with less than about 5 weight % water miscible solvent, more preferably less than about 2 weight % water miscible solvent, and most preferably, less than about 1 weight % water miscible solvent, based on the weight of the aqueous thickener composition. Most preferred is the aqueous thickener composition that does not contain water miscible solvent. Further, the aqueous thickener composition may be provided substantially free of surfactant. As used herein, "substantially free of surfactant" refers to a composition containing less than about 5 weight %, preferably less than about 1 weight %, and more preferably less than about 0.3 weight % surfactant, based on the weight of the aqueous composition. The aqueous thickener composition that is substantially free of surfactant includes surfactant in the range of from zero to about 5 weight %, preferably in the range of from zero to about 1 weight %, and more preferably in the range of from zero to about 0.3 weight %. For example, the aqueous thickener composition may be provided containing from about 10 to about 20 weight % nonionic associative thickener, less than about 0.3 weight % surfactant, and from about 79.7 to about 90 weight % water.

The aqueous thickener composition optionally contains at least one macromolecular organic compound having a hydrophobic cavity. The macromolecular organic compound having a hydrophobic cavity may be added to suppress the viscosity of the aqueous thickener composition, or to provide the aqueous thickener composition with a higher solids level of nonionic associative thickener than in the absence of the macromolecular organic compound having a hydrophobic cavity. Suitable macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative. The amount of macromolecular organic compound having a hydrophobic cavity included in the aqueous thickener composition may be in the range of from about 0.1 to about 50 weight %, preferably about 0.1 to about 30 weight %, and more preferably about 0.5 to about 10 weight %, based on the total weight of the aqueous thickener composition.

In one non-limiting embodiment, the aqueous thickener composition is provided as an aqueous dispersion, wherein the nonionic associative thickener is partially or completely solubilized in water, or alternatively, the nonionic associative thickener is dispersed in water as discrete particles of the nonionic associative thickener. This aqueous dispersion is typically characterized by a hazy, white appearance, for example, when prepared at about 1 weight % nonionic associative thickener solids, based on the weight of the aqueous dispersion. Preferably, this aqueous dispersion is substantially free of surfactant. For example, the aqueous dispersion of this non-limiting embodiment may be provided containing from about 10 to about 20 weight % of the nonionic associative thickener, less than about 0.3 weight % surfactant, and from about 79.7 to about 90 weight % water, based on the weight of the aqueous dispersion.

The nonionic associative thickener may be incorporated into compositions, including aqueous compositions or non-aqueous compositions, in amounts ranging from about 0.005 weight % to about 20 weight %, preferably from about 0.01 weight % to about 10 weight %, and most preferably from about 0.05 weight % to about 5 weight %, based on the weight of the composition. Optionally, the composition contains other ingredients, such as pigments; extenders; colorants, surfactants; salts; buffers; pH adjustment agents such as bases and acids; biocides; mildewcide; wetting agents; defoamers; dispersants; pigments; dyes; water miscible organic solvents; anti-freeze agents; corrosion inhibitors; adhesion promoters; waxes; and crosslinking agents. In one non-limiting embodiment, a composition is provided that contains the nonionic associative thickener and at least one material selected from pigment, extender, or colorant.

Examples of suitable pigments include zinc oxide, antimony oxide, zirconium oxide, chromium oxide, iron oxide, lead oxide, zinc sulfide, lithopone, and titanium dioxide such as, for example, anatase and rutile titanium dioxide.

Examples of suitable extenders include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

Suitable colorant include inorganic colorant particles and organic colorant particles. Suitable inorganic colorant particles include, but are not limited to, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass. One group of preferred inorganic colorant particles is selected from bismuth pigments; mixed metal oxide pigments; chromate and molybdate pigments; ultramarine pigments; cobalt oxide pigments; nickel antimony titanates; lead chrome; blue iron pigments; carbon black; and metal effect pigments.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Examples of suitable organic colorant particles and inorganic colorant particles include: Color Index Pigment Yellow 1, 2, 3, 5, 6, 10, 12, 13, 14, 16, 17, 62, 65, 73, 74, 75, 81, 83, 87, 90, 93, 94, 95, 97, 98, 99, 199, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 155, 165, 166, 167, 168, 169, 170, 171, 172, 173, 174, 175, 176, 177, 179, 180, 181, 182, 183, 184, 185, 187, 188, 190, 192, 193, and 194; Color Index Pigment Orange 1, 2, 5, 6, 13, 15, 16, 17, 17:1, 19, 22, 24, 31, 34, 36, 38, 40, 43, 44, 46, 48, 49, 51, 60, 61, 62, 64, 65, 66, 67, 68, and 69; Color Index Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 49:1, 49:2, 49:3, 50;1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264; Color Index Pigment Violet: 1, 2, 3, 5:1, 13, 19, 23, 25, 27, 29, 31, 32, 37, 39, 42, 44, and 50; Color Index Pigment Blue 1, 2, 9, 10, 14, 15:1, 15:2, 15:3, 15:4, 15:6, 15, 16, 18, 19, 24:1, 25, 56, 60, 61, 62, 63, 64, and 66; Color Index Pigment Green 1, 2, 4, 7, 8, 10, 36, and 45; Color Index Pigment Black 6, 7, 10, 11, and 28; and Color Index Pigment Brown 1, 5, 22, 23, 25, 38, 41, and 42.

Examples of aqueous compositions which may include the nonionic associative thickener of this invention are paints, such as latex paints; coatings; cosmetics, personal care items such as, for example, shampoos, hair conditioners, hand lotions, hand creams, astringents, depilatories, and antiperspirants; sealants; inks such as, for example, digital imaging inks; cements; caulks; drilling fluids such as oil well flooding compositions and drilling muds, including secondary and tertiary drilling muds; salt solutions; anti-icing solutions; fire fighting fluids; topical pharmaceuticals; adhesives including tile adhesives and ceramic adhesives; cleaners; detergents; fabric softeners; pesticidal and agricultural compositions; paper or board coating formulations; textile formulations; and nonwoven formulations. Examples of non-aqueous compositions include alkyd coating compositions or urethane coating compositions.

In one non-limiting embodiment, the aqueous composition is a latex composition. An aqueous latex composition contains polymer particles dispersed in an aqueous medium. Surfactants, such as, for example, nonionic or anionic surfactants are commonly used in the preparation or the stabilization of the aqueous latex composition. Examples of aqueous latex compositions include (meth)acrylic latex compositions, vinyl acetate latex compositions, ethylene-vinyl acetate latex compositions, styrene butadiene latex compositions, vinyl chloride latex compositions, and aqueous polyurethane dispersions. Aqueous latex compositions typically have average polymer particle diameters in the range of from about 20 nanometers to about 1 micron. The level of addition of the nonionic associative thickener is typically dependent upon the desired level of thickening or viscosity for the aqueous composition. Examples of aqueous latex compositions include latex paints, textile formulations, nonwoven formulations, leather coatings; paper or board coating formulations; and adhesives. The nonionic associative thickener of this invention is useful for increasing the viscosity of aqueous dispersions such as aqueous latex compositions.

Mixing techniques may be employed to incorporate the nonionic associative thickener in a composition, including conventional mixing equipment such as, for example, mechanical lab stirrers, high speed dispersers, ball mills, sand mills, pebble mills, and paddle mixers. The nonionic associative thickener may be added to the composition as a solid, such as a powder; or in liquid form, such as a slurry, or a dispersion. Preferably, the liquid form of the nonionic associative thickener is the aqueous thickener composition when added to an aqueous composition. Optionally, surfactant may be added prior to, during, or after the addition of the nonionic associative thickener to the aqueous composition.

The present invention provides a method of thickening a composition including the step of adding the nonionic associative thickener to the composition.

The method of the present invention may be employed to provide compositions that do not undergo a viscosity decrease with increasing temperature. For example, aqueous compositions, such as aqueous latex paints, may be provided with a desired viscosity at a temperature range of from about 15° C. to about 30° C., and not undergo a decrease in viscosity at a higher temperatures, such as a temperature range of from about 40° C. to about 50° C.

The nonionic associative thickener composition of this invention may be provided as a mixture containing one or more other cothickeners. Alternatively, the nonionic associative thickener and a cothickener may be added individually to a composition concurrently or sequentially. Examples of other suitable thickeners include hydrophobically modified alkali swellable emulsions, hydroxyethyl cellulose, alkali swellable emulsion, and other associative thickeners, such as associative thickeners containing only polyoxyethylene sidechains.

In one non-limiting embodiment, the aqueous composition contains at least one nonionic associative thickener of this invention and a low molecular weight associative cothickener. The low molecular weight associative cothickener has a weight average molecular weight that is about 0.5 or less than the weight average molecular weight of the nonionic associative thickener of this invention. In a further non-limiting embodiment, the cothickener is an diphobe, triphobe, or quadraphobe associative thickener, which has two, three, or four pendant hydrophobes, respectively. The pendant hydrophobes are not contained within the polymer backbone. Examples of diphobe associative thickeners include linear polymers, and branched polymers having two hydrophobes and at least one branch without a hydrophobe. Examples of triphobes and quadraphobe associative thickeners include branched, star-shaped, and comb-shaped polymers. The diphobe, triphobe, or quadraphobe associative cothickeners of the present embodiment may contain only polyoxyethylene sidechains.

A common problem in aqueous latex paints containing associative thickeners is a decrease in viscosity when colorants are added, particularly colorants that contain high levels of surfactant. This is especially problematic when the paint is tinted to a deep tone because a high level of surfactant generally accompanies the colorant. Light-tint (pastel) paints typically contain no more than 31 ml/l (4 oz/gal) of colorant. Mid-tone paints typically contain from greater than 31 ml/l (4 oz/gal) to 63 ml/l (8 oz/gal) of colorant. Deep tone paints typically contain 63 ml/l (8 oz/gal) up to 94 ml/l (12 oz/gal) of colorant. Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost, or both, particularly in deep tone paints. Further, as numerous combinations of colorants and colorant addition levels are employed to provide a broad palette of paint colors, the viscosity depressions of the tinted paints may vary considerably, resulting in tinted paints with unsatisfactory application properties, leveling, or sagging. The nonionic associative thickeners of this invention may be employed to thicken aqueous latex compositions, such as aqueous latex paints, and to provide these compositions with improved resistance to the viscosity decrease that occurs with the addition of surfactant containing compositions, such as colorants.

In certain aqueous latex compositions, associative thickeners that have nonionic backbones and oxyalkylene chains formed from only oxyethylene units in the polymer backbones and the sidechains, may cause bridging between latex particles. This phenomenon may lead to flocculation or syneresis of the aqueous latex composition. Syneresis is the separation of water from the aqueous phase containing the latex particles and may be observed by a separate water phase. Generally, syneresis is undesirable in aqueous latex compositions. In one non-limiting embodiment, the nonionic associative thickener of the present invention is employed in an aqueous latex composition to minimize or eliminate syneresis.

A volatile organic compound ("VOC") is defined herein as a carbon containing compound that has a boiling point below 280° C. at atmospheric pressure. Compounds such as water and ammonia are excluded from VOCs. The nonionic associative thickener may be provided as a low VOC composition. As used herein, a low VOC composition contains less than about 5% VOC by weight, preferably less than about 3% VOC by weight, and more preferably, less than about 1.7% VOC by weight, based on the total weight of the low VOC composition. For example, the aqueous thickener composition may be provided as a low VOC composition.

The following examples are presented to illustrate the process and the composition of the invention. These examples are intended to aid those skilled in the art in understanding the present invention. The present invention is, however, in no way limited thereby.

The following abbreviations are used in the examples:

| | |
|---|---|
| HDI | 1,6-hexamethylene diisocyanate |
| $M_n$ | number average molecular weight |
| $M_w$ | weight average molecular weight |
| PEG | polyethylene glycol |

Determination of Molecular Weights of the Nonionic Associative Thickeners

The weight average molecular weights and the number average molecular weights of the nonionic associative thickeners were determined using size exclusion chromatography. The separations were carried out on a liquid chromatograph, which included an Agilent 1100 Model isocratic pump and an autosampler (Waldbronn, Germany), an Eppendorf CH-430 Model column oven (Madison, Wis.), and Waters 410 Model differential refractometer (Milford, Mass.). The oven and the refractometer were operated at 40° C. System control, data acquisition, and data processing were performed using Calibers® software (Polymer Laboratories, Church Stretton, UK).

Samples were prepared in tetrahydrofuran (THF) at concentrations of 2 milligram/milliliter (mg/ml) and filtered using 0.45 micron filter.

The SEC separations were performed in THF (certified grade) at 1 milliliter/minute using a SEC column set having three PLgel columns (300×7.5 mm ID) packed with polystyrene-divinylbenzene gel (pore size marked as 100 Å, $10^3$ Å and $10^4$ Å, particle size 5 microns) purchased from Polymer Laboratories (Church Stretton, UK). The sample size was 100 microliters with concentration C=2 milligram/milliliter. The molar mass characteristics of the analyzed samples were calculated based on polystyrene standards (Polymer Laboratories, Church Stretton, UK).

EXAMPLE 1

Preparation of Nonionic Associative Thickeners

EXAMPLE 1.1

A mixture of 200.0 g PEG (molecular weight 8000) and 325.0 g toluene was dried by azeotropic distillation. The mixture was cooled to 90° C., and 0.2 g dibutyltin dilaurate and 7.0 g HDI was added. After 1 hour at 90° C., 41.0 g polypropylene glycol monobutyl ether (molecular weight 1000) was added. The mixture was then maintained at 90° C. for another hour. The nonionic associative thickener of Example 1.1 was isolated as a solid after toluene evaporation, and had a Mw of 32,500 and a Mn of 22,400.

EXAMPLE 1.2

A mixture of 210.0 g PEG (molecular weight 8000) and 340.0 g toluene was dried by azeotropic distillation. The mixture was cooled to 90° C., and 0.2 g dibutyltin dilaurate and 11.3 g 4,4'-methylene bis-(isocyanatocyclohexane) was added. After 1 hour at 90° C., 43.3 g polypropylene glycol monobutyl ether (molecular weight 1000) was added. The mixture was then maintained at 90° C. for another hour. The nonionic associative thickener of Example 1.2 was isolated as a solid after toluene evaporation.

EXAMPLE 1.3

A mixture of 185.0 g PEG (molecular weight 8000), 10.7 g poly(ethylene glycol)-block-poly(propylene glycol)-block-poly(ethylene glycol) (50 wt % ethylene glycol), (molecular weight 1900) and 325.0 g toluene was dried by azeotropic distillation. The mixture was cooled to 90° C., and 0.2 g dibutyltin dilaurate and 7.0 g HDI was added. After 1 hour at 90° C., 34.0 g polypropylene glycol monobutyl ether (molecular weight 1000) was added. The mixture was then maintained at 90° C. for another hour. The nonionic associative thickener of Example 1.3 was isolated as a solid after toluene evaporation, and had a Mw of 55,800 and a Mn of 33,200.

EXAMPLE 1.4

A mixture of 210.0 g PEG (molecular weight 8000), 20.6 g poly(ethylene glycol)-block-poly(propylene glycol)-block-poly(ethylene glycol) (50 wt % ethylene glycol), and 440.0 g toluene was dried by azeotropic distillation. The mixture was cooled to 90° C., and 0.2 g dibutyltin dilaurate and 1.0 g 4,4'-methylene bis-(isocyanatocyclohexane) was added. After 1 hour at 90° C., the mixture was cooled down to 80° C. and 21.6 g polypropylene glycol monobutyl ether (molecular weight 1000) was added. The mixture was then maintained at 80° C. for another hour. The nonionic associative thickener of Example 1.4 was isolated as a solid after toluene evaporation.

EXAMPLE 1.5

A mixture of 200.0 g PEG (molecular weight 8000) and 325.0 g toluene was dried by azeotropic distillation. The mixture was cooled to 90° C., and 0.2 g dibutyltin dilaurate and 7.0 g HDI was added. After 1 hour at 90° C., 65.7 g polypropylene glycol monotridecyl ether (molecular weight 1590) was added. The mixture was then maintained at 90° C. for another hour. The nonionic associative thickener of Example 1.5 was isolated after toluene evaporation, and had a Mw of 50,000 and a Mn of 32,300.

EXAMPLE 1.6

A mixture of 200.0 g PEG (molecular weight 8000), 1.20 g 1,2-dodecanediol and 325 g toluene was dried by azeotropic distillation. The mixture was cooled to 90° C., and 0.2 g dibutyltin dilaurate and 7 g HDI was added. After 1 hour at 90° C., 46.0 g polypropylene glycol monotridecyl ether (molecular weight 1590) was added. The mixture was then maintained at 90° C. for another hour. The nonionic associative thickener of Example 1.6 isolated as a solid after toluene evaporation, and had a Mw of 56,400 and a Mn of 36,600.

Example 1.7

A mixture of 210.0 g PEG (molecular weight 8000), 1.59 g 1,2-dodecanediol and 340.0 g toluene was dried by azeotropic distillation. The mixture was cooled to 90° C., and 0.2 g dibutyltin dilaurate and 11.3 g 4,4'-methylene bis(isocyanatocyclohexane) was added. After 1 hour at 90° C., 27.5 g propylene glycol monobutyl ether (molecular weight 1000) was added. The mixture was then maintained at 90° C. for another hour. The nonionic associative thickener of Example 1.7 was obtained as a solid after toluene evaporation.

EXAMPLE 1.8

A mixture of 200.0 g PEG (molecular weight 8000), 5.1 g glycerol ethoxylates (1200 molecular weight), and 325.0 g toluene was dried by azeotropic distillation. The mixture was cooled to 90° C., and 0.2 g dibutyltin dilaurate and 1.0 g HDI was added. After 1 hour at 90° C., 28.9 g polypropylene glycol monobutyl ether (molecular weight 1000) was added. The mixture was then maintained at 90° C. for another hour. The nonionic associative thickener of Example 1.8 was obtained as a solid after toluene evaporation.

EXAMPLE 1.9

A mixture of 200.0 g PEG (molecular weight 8000), 5.1 g glycerol ethoxylates (1200 molecular weight), and 325.0 g toluene was dried by azeotropic distillation. The mixture was cooled to 90° C., and 0.2 g dibutyltin dilaurate and 7.0 g HDI was added. After 1 hour at 90° C., the mixture was cooled down to 80° C., and a mixture of 9.4 g polypropylene glycol monobutyl ether (molecular weight 1000) and 3.1 g decanol was added. The mixture was then maintained at 80° C. for another one hour. The nonionic associative thickener of Example 1.9 was obtained as a solid after toluene evaporation, and had a Mw of 58,300 and a Mn of 33,900.

EXAMPLE 1.10

A mixture of 200.0 g PEG (molecular weight 8000) and 325.0 g toluene was dried by azeotropic distillation. The mixture was cooled to 90° C., and 0.2 g dibutyltin dilaurate and a mixture of 4.7 g HDI and 1.9 g hydrolytic trimerization product of 1,6-hexamethylene diisocyanate was added. After 1 hour at 90° C., the mixture was cooled down to 80° C. and 36.7 g polypropylene glycol monotridecyl ether (molecular weight 1590) was added. The mixture was then maintained at 80° C. for another hour. The nonionic associative thickener of Example 1.10 was obtained as a solid after toluene evaporation.

EXAMPLE 1.11

A mixture of 200.0 g PEG (molecular weight 8000), 5.1 g glycerol ethoxylates (molecular weight 1000), and 325.0 g toluene was dried by azeotropic distillation. The mixture was cooled to 90° C., and 0.2 g dibutyltin dilaurate and 7.0 g HDI was added. After 1 hour at 90° C., 46.0 g polypropylene glycol monotridecyl ether (molecular weight 1590) was added. The mixture was then maintained at 90° C. for another hour. The nonionic associative thickener of Example 1.11 was obtained as a solid after toluene evaporation, and had a Mw of 72,900 and a Mn of 41,600.

EXAMPLE 1.12

A mixture of 185.0 g PEG (molecular weight 8000), 10.7 g poly(ethylene glycol)-b-poly(propylene glycol)-b-poly(ethylene glycol) (50 wt % ethylene glycol), 5.1 g glycerol ethoxylates, and 325.0 g toluene was dried by azeotropic distillation. The mixture was cooled to 90° C., and 0.2 g dibutyltin dilaurate and 7.0 g HDI was added. After 1 hour at 90° C., the mixture was cooled down to 80° C. and 33.8 g polypropylene glycol monobutyl ether (molecular weight 1000) was added. The mixture was then maintained at 80° C. for another one hour. The nonionic associative thickener of Example 1.12 was obtained as a solid after toluene evaporation.

Comparative A—A mixture of 127.0 g polyethylene oxide dodecyl ether (molecular weight 4200) and 225.0 g toluene was dried by an azeotropic distillation. The mixture was cooled to 90° C., and 0.2 g dibutyltin dilaurate and 3.9 g 4,4'-methylene bis-(isocyanatocyclohexane) were added. After 1 hour at 90° C. with stirring, the comparative nonionic associative thickener of Comparative A was obtained as a solid after toluene evaporation.

Comparative B—A mixture of 127.0 g polyethylene oxide dodecyl ether (molecular weight 4200) and 225.0 g toluene was dried by an azeotropic distillation. The mixture was cooled to 90° C., and 0.2 g dibutyltin dilaurate and 5.9 g hydrolytic trimerization product of 1,6-hexamethylene diisocyanate were added. After 1 hour at 90° C. with stirring, the comparative nonionic associative thickener of Comparative B was obtained as a solid after toluene evaporation.

Comparative C—A heavy duty laboratory mixer (Universal Sigma Blade Mixer, sold by Baker Perkins Guirad SA, Paris, France) was heated to a temperature of 85° C. To the mixer was added 2153 g of dry, molten 85° C. PEG (molecular weight 8000), followed by the addition of 110.9 g of 4,4'-methylene bis-(isocyanatocyclohexane) and 44.2 g of hexanol. The contents of the mixer was mixed. Next, 5.3 g of 28% bismuth (III) octoate was added to the mixer to catalyze the reaction. The contents of the mixer was maintained at a temperature of 85° C. under a nitrogen blanket and mixed for 30 minutes. Upon cooling, the resulting solid polymer had a Mw of 38,000 and a Mn of 25,000.

Comparative D—The thickener of comparative D was prepare according to the general procedure of Comparative C.

The comparative thickener was prepared from 2213 g of dry, molten 85° C. PEG (molecular weight 8000), 73.3 g of HDI, and 68.9 g of decanol with 5.3 g of 28% bismuth (III) octoate as the catalyst. The resulting solid polymer had a Mw of 38,000 and a Mn of 25,000.

EXAMPLE 2

The Preparation of Aqueous Dispersions of Examples 1.1 to 1.12

The nonionic associative thickeners of Examples 1.1 to 1.12 were prepared as aqueous dispersions. The aqueous dispersions were made by tumbling a mixture of nonionic associative thickener solids and water for a period of 24 hours. For some aqueous dispersions with high viscosity, a mechanical stirrer was used to help uniformly distribute the nonionic associative thickener in the water. The aqueous dispersions of Examples 1.1 to 1.12 did not contain added surfactant.

The viscosities in Table 2.1 were measured using a Brookfield Viscometer Model DV-II+ (Brookfield Engineering, Inc., Brookfield, Mass.) using a #4 spindle at 12 rpm. The viscosities were measured at 25° C. The viscosities are reported in units of Pascal second (Pa.s). The concentrations of the nonionic associative thickeners in the aqueous dispersions are expressed as percentage of dry weight of the nonionic associative thickener, based on total weight of the aqueous dispersion.

TABLE 2.1

Aqueous Dispersion Viscosities of Aqueous Dispersions of Examples 1.1 to 1.12

| Example | Aqueous Dispersion Solids (wt. %) | Viscosity 25° C. (Pa · s) |
|---|---|---|
| 1.1 | 16 | 0.7 |
| 1.2 | 16 | 92 |
| 1.3 | 16 | 1.34 |
| 1.4 | 16 | 196 |
| 1.5 | 6 | 10.8 |
| 1.6 | 6 | 25.8 |
| 1.7 | 2 | 12.2 |
| 1.8 | 16 | 3.79 |
| 1.9 | 16 | 3.15 |
| 1.10 | 2 | 15 |
| 1.11 | 6 | 30 |
| 1.12 | 16 | 2.7 |

EXAMPLE 3

Effect of Temperature on the Viscosities of the Aqueous Thickener Compositions Aqueous dispersions of Examples 1.5 and 1.11 were prepared at concentrations of 6 weight % and 4 weight %, respectively. The dispersions were made by tumbling a mixture of the nonionic associative thickener solids and water until the nonionic associative thickener was uniformly distributed in the water. The aqueous dispersions were temperature equilibrated in a glass container in a constant temperature water bath for a period of at least two hours. The viscosities in Table 3.1 were measured using a Brookfield Viscometer Model DV-II+ (Brookfield Engineering, Inc., Brookfield, Mass.) using a #4 spindle at 6 rpm or 12 rpm. The comparative behavior of the Acrysol™ RM-8 thickener of the Rohm and Haas Company is also shown. Acrysol™ RM-8 thickener is a comparative nonionic associative thickener having a polyurethane backbone and containing alkylene oxide segments formed only from oxyethylene groups in the polymer backbone and the sidechains.

TABLE 3.1

Effect of Temperature on Brookfield Viscosities (Pa · s)

| Temperature (° C.) | Example 1.5 6 wt. % | Example 1.11 4 wt. % | Acrysol ™ RM-8 Thickener 4 wt. % |
|---|---|---|---|
| 25 | 11 | 9.4 | 4.4 |
| 30 | 15 | 14 | — |
| 40 | 30 | 29 | — |
| 50 | 44 | 49 | 0.40 |

The results in Table 3.1 showed that the viscosities of aqueous solutions containing the nonionic associative thickeners of Examples 1.5 and 1.11 increased as the temperature increased. In contrast, the viscosities of a comparative aqueous solution containing the comparative associative thickener, Acrysol™ RM-8 thickener, decreased as the temperature increased.

EXAMPLE 4

Effect of Temperature on the Viscosities of the Aqueous Thickener Compositions Containing Cyclodextrin Aqueous thickener compositions were prepared from Examples 1.5 and 1.11 with the addition of methyl-β-cyclodextrin to provide the aqueous thickener compositions at higher solids and solution viscosities that are pourable. The level of dry cyclodextrin added to these compositions was 0.6 weight %, based on dry weight of the nonionic associative thickener. The compositions were prepared by tumbling a mixture of the solid polymer sample, cyclodextrin solution, and water until the nonionic associative thickener and the cyclodextrin were uniformly distributed in the water. The viscosities of these compositions were measured at various temperatures. The viscosities in Table 4.1 were measured using a Brookfield Viscometer Model DV-II+ (Brookfield Engineering, Inc., Brookfield, Mass.) using a #4 spindle at 6 rpm or 12 rpm. Acrysol™ RM-8W thickener of Rohm and Haas Company is included as a comparative example.

TABLE 4.1

Effect of Temperature on the Brookfield Viscosities (Pa · s) of Aqueous Dispersions of Nonionic Associative Thickeners Containing Cyclodextrin

| Temperature (° C.) | Example 1.5 (15 wt. %) | Example 1.11 (10 wt. %) | Acrysol ™ RM-8 Thickener |
|---|---|---|---|
| 25 | 6.2 | 6.1 | 3.5 |
| 30 | 9.5 | 10 | 2.9 |
| 40 | 23 | 31 | 2.1 |
| 50 | 46 | 81 | 1.3 |

The results in Table 4.1 showed that the viscosities of aqueous solutions containing the nonionic associative thickeners of Examples 1.5 and 1.11 and cyclodextrin increased as the temperature increased. In contrast, the viscosities of a comparative aqueous solution containing the comparative associative thickener, Acrysol™ RM-8 and cyclodextrin, decreased as the temperature increased. Further, a comparison of the results in Tables 3.1 and 4.1 show that the addition of cyclodextrin allowed the preparation of aqueous dispersions of Examples 1.5 and 1.11 at higher solids levels and lower viscosities at 25° C. than in the absence of cyclodextrin.

EXAMPLE 5

Effect of Surfactant on the Viscosities of the Aqueous Thickener Compositions

EXAMPLE 5.1

Aqueous Thickener Compositions Containing Triton™ X-405 Surfactant

Aqueous thickener compositions were prepared containing the nonionic associative thickener of Example 1.11 at 4 weight % solids and various levels of Triton™ X-405 surfactant. Triton™ X-405 surfactant is a product of Dow-Carbide Company, Midland, Mich. Each aqueous dispersion was made by a dilution of a 10% stock dispersion of the nonionic associative thickener with water containing a calculated amount of Triton™ X-405 surfactant. A mechanical stirrer was used to provide a uniform distribution of the nonionic associative thickener in the water. The aqueous dispersion typically changed from a cloudy appearance to a transparent appearance in the presence of the surfactant. The dispersions were equilibrated at various temperatures in a water bath for at least two hours prior to the viscosity measurement. The concentration of the added Triton™ X-405 surfactant was based on the total weight of the aqueous dispersion.

TABLE 5.1

Effect of Triton ™ X-405 Surfactant on Brookfield Viscosity (Pa · s) of Aqueous Dispersion of Example 1.11

| Temperature (° C.) | Concentration of added Triton ™ X-405 Surfactant (wt. %) | | | | |
|---|---|---|---|---|---|
| | 0 wt. % | 1 wt. % | 2 wt. % | 5 wt. % | 10 wt. % |
| 25 | 9.4 | 5.5 | 3.7 | 0.55 | 0.16 |
| 30 | 14 | 8.0 | 5.1 | 0.64 | 0.18 |
| 40 | 29 | 16 | 9.7 | 0.96 | 0.22 |
| 50 | 49 | 25 | 14 | 1.5 | 0.29 |

The results in Table 5.1 show that the addition of at least 1 weight % Triton™ X-405 surfactant decreases the viscosity of the aqueous dispersion of Example 1.11. Additional amounts of Triton™ X-405 surfactant leads to further decreases in viscosity. The viscosities of the aqueous dispersions containing Triton™ X-405 surfactant increased with increased temperature.

EXAMPLE 5.2

Aqueous Thickener Compositions Containing Triton™ X-114 Surfactant

Aqueous thickener compositions were prepared containing the nonionic associative thickener of Example 1.11 at 4 weight % solids and various levels of Triton™ X-114 surfactant were prepared according to the procedure described in Example 5.1. Triton™ X-114 surfactant is a product of Dow-Carbide Company, Midland, Mich. The viscosities of the aqueous dispersions were measured according to the procedure described in Example 5.1. The concentration of the added Triton™ X-114 surfactant was based on the total weight of the aqueous dispersion.

TABLE 5.2

Effect of Triton ™ 114 Surfactant on Brookfield Viscosity (Pa · s) of Aqueous Dispersion of Example 1.11

| Temperature (° C.) | Concentration of added Triton ™ X-114 Surfactant (wt. %) | | |
|---|---|---|---|
| | 0 wt. % | 1 wt. % | 2 wt. % |
| 25 | 9.4 | 72 | 3.8 |
| 30 | 14 | 120 | 4.3 |
| 40 | 29 | 320 | 4.6 |
| 50 | 49 | 580 | 4.3 |

The results in Table 5.2 show that the addition of 1 weight % Triton™ X-114 surfactant led to an increase in the viscosity of the aqueous dispersion of Example 1.11 for temperatures in the range of 25 to 50° C. The viscosities of these aqueous dispersions with 1 weight % Triton™ X-114 surfactant increased with increasing temperature. In contrast, the aqueous dispersion containing 2 weight % Triton™ X-114 surfactant had decreased viscosities compared to the aqueous dispersion in the absence of surfactant. Further, the aqueous dispersion with 2 weight % of the surfactant showed a slight increase in viscosity between 25° C. and viscosities at in the range of 30 to 50° C.

EXAMPLE 5.3

Aqueous Thickener Compositions Containing Various Surfactants

Aqueous dispersions of Example 1.11 were prepared at 2 weight % solids and 0.5 weight % of surfactant. The surfactants were added at a level of 0.5 weight % solids, based on the weight of the aqueous dispersion. The aqueous dispersions were prepared according to the general procedure of Example 5.1. The dispersions were equilibrated at either 25° C. or 45° C. in a water bath for at least two hours prior to viscosity measurement.

TABLE 5.3

Effect of Various Surfactants on Brookfield Viscosity of Aqueous Dispersions of Example 1.11 at Temperatures of 25° C. and 45° C.

| Surfactant | Type | HLB value | Brookfield viscosity (Pa · s) | |
|---|---|---|---|---|
| | | | 25° C. | 45° C. |
| no added surfactant | — | — | 0.7 | 3.0 |
| Surfonic ™ DNP-80 surfactant | ethoxylated dinonylphenol | 10.2 | 7.3 | 37 |
| Surfonic ™ DNP-140 surfactant | ethoxylated dinonylphenol | 13.2 | 5.4 | 29 |
| Surfonic ™ DNP-240 surfactant | ethoxylated dinonylphenol | 15.1 | 3.0 | 14 |
| Surfonic ™ N-60 surfactant | ethoxylated nonylphenol | 10.9 | 8.1 | 22 |
| Triton ™ X-114 surfactant | ethoxylated octylphenol | 12.3 | 9.5 | 43 |
| Triton ™ X-100 surfactant | ethoxylated octylphenol | 13.4 | 4.9 | 21 |
| Triton ™ X-405 surfactant | ethoxylated octylphenol | 17.6 | 0.7 | 1.5 |
| Triton ™ CF-10 surfactant | modified polyether | 12.6 | 3.6 | 16 |
| Dextrol ™ OC-50 surfactant | sodium salt phosphate ester | Anionic | 8.8 | 30 |
| Strodex ™ PK-95G surfactant | potassium salt phosphate ester | Anionic | 3.8 | 8.3 |

TABLE 5.3-continued

Effect of Various Surfactants on Brookfield Viscosity of Aqueous Dispersions of Example 1.11 at Temperatures of 25° C. and 45° C.

| Surfactant | Type | HLB value | Brookfield viscosity (Pa · s) 25° C. | 45° C. |
|---|---|---|---|---|
| Triton ™ GR-7M surfactant | dioctyl sodium sulfosuccinate | Anionic | 1.2 | 2.4 |

The Surfonic ™ surfactants are products of Huntsman Corporation.
Dextrol ™ OC-50 surfactant and Strodex ™ PK-95G surfactant are products of Dexter Chemical L.L.C.
The Triton ™ surfactants are products of Dow-Carbide Company.

The results in Table 5.3 showed that the aqueous dispersions of Example 1.11 containing 0.5 weight % surfactant showed increased viscosities at 45° C. compared to 25° C.

EXAMPLE 6

Effect of Salt on the Viscosities of the Aqueous Thickener Compositions

EXAMPLE 6.1

Aqueous Thickener Compositions Containing Calcium Chloride

Aqueous thickener compositions were prepared containing the nonionic associative thickener of Example 1.11 at 4 weight % solids and various levels of calcium chloride. Each aqueous dispersion was made by a dilution of a 10% stock dispersion of the nonionic associative thickener with water containing a calculated amount of calcium chloride. A mechanical stirrer was used to provide a uniform distribution of the nonionic associative thickener and the calcium chloride in the water. The aqueous dispersions were equilibrated to temperature in a water bath for at least two hours prior to the viscosity measurement. The concentration of the calcium chloride is based on the total weight of the aqueous dispersion.

TABLE 6.1

Effect of Calcium Chloride on Brookfield Viscosity (Pa · s) of Aqueous Compositions of Example 1.11 at Several Temperatures

| Temperature (° C.) | Concentration of Calcium Chloride (wt. %) | | | | |
|---|---|---|---|---|---|
| | 0 wt. % | 1 wt. % | 2 wt. % | 5 wt. % | 10 wt. % |
| 25 | 7.6 | 12 | 13 | 27 | 170 |
| 30 | 11 | 18 | 18 | 37 | 260 |
| 40 | 23 | 38 | 41 | 78 | 520 |
| 50 | 38 | 58 | 59 | 96 | 470 |

The results in Table 6.1 show that the addition of calcium chloride led to an increase in the viscosity of the aqueous dispersion of Example 1.11 for temperatures in the range of from 25° C. to 50° C.

EXAMPLE 6.2

Aqueous Thickener Compositions Containing Various Salts

Aqueous thickener compositions were prepared containing the nonionic associative thickener of Example 1.11 at 2 weight % solids and various types of salts. The concentration of the added salt was based on the total weight of the aqueous dispersion. The aqueous thickener compositions were prepared and tested according to the general procedure for Example 6.1.

TABLE 6.2

Effect of Various Salts on the Brookfield Viscosity (Pa · s) of Aqueous Compositions of Example 1.11 at 25° C. and 45° C.

| Salts | Salt Concentration wt % | Brookfield Viscosity (Pa · s) 25° C. | 45° C. |
|---|---|---|---|
| None | 0 | 0.70 | 3.0 |
| LiCl | 10 | 93 | 230 |
| NaCl | 10 | 32 | 2.3 |
| KCl | 10 | 8.8 | 0.70 |
| $NaNO_3$ | 10 | 3.3 | 5.9 |
| $MgCl_2$ | 10 | 47 | 110 |
| $CaCl_2$ | 10 | 39 | 76 |
| $BaCl_2$ | 10 | 5.7 | 14 |
| $ZnCl_2$ | 10 | 4.3 | 4.0 |
| $Ca(NO_3)_2$ | 10 | 2.6 | 10 |
| $AlCl_3$ | 10 | 47 | 60 |
| $MgSO_4$ | 5 | * | * |
| $Na_2SO_4$ | 2 | 1.5 | 2.0 |
| $Na_2SO_4$ | 5 | * | * |
| $Na_2CO_3$ | 2 | 0.80 | * |
| $Na_2CO_3$ | 5 | * | * |
| $Na_3PO_4$ | 5 | * | * |

* Dispersion was not homogeneous.

The results in Table 6.2 showed that a variety of salts increased the viscosity of the aqueous composition of Example 1.11. Further, the results generally showed that the viscosity increase of the aqueous composition was larger as the size of cation decreased.

EXAMPLE 7

Effect of Salt and Surfactant on the Viscosities of the Aqueous Thickener Compositions

EXAMPLE 7.1

Aqueous Thickener Compositions Containing Calcium Chloride and Triton™ X-114 Surfactant Aqueous thickener compositions were prepared containing the nonionic associative thickener of Example 1.11 at 2 weight % solids, 0.5 weight % Triton™ X-114 surfactant, and calcium chloride. The concentration of the calcium chloride and the concentration of the surfactant are based on the total weight of the aqueous dispersion. The aqueous thickener compositions were prepared and tested according to the general procedure for Example 6.1.

TABLE 7.1

Effect of Calcium Chloride and Temperature on the Brookfield Viscosity of Aqueous Compositions of Example 1.11 Containing Triton ™ X-114 Surfactant

| Calcium Chloride | Triton ™ X-114 Surfactant | Brookfield Viscosity (Pa · s) | | | |
|---|---|---|---|---|---|
| (wt %) | (wt %) | 25° C. | 30° C. | 40° C. | 50° C. |
| 0 | 0.5 | 5.4 | 5.0 | 8.2 | 6.2 |
| 1 | 0.5 | 13 | 24 | 48 | 67 |
| 2 | 0.5 | 16 | 29 | 55 | 88 |
| 5 | 0.5 | 36 | 66 | 130 | 150 |
| 10 | 0.5 | 140 | 260 | 450 | 420 |

The results in Table 7.1 showed that calcium chloride increased the viscosity of the aqueous composition containing the nonionic associative thickener and surfactant over a range of calcium chloride concentrations and temperatures.

EXAMPLE 7.2

Aqueous Thickener Compositions Containing Various Salts and Triton™ X-114 Surfactant Aqueous thickener compositions were prepared containing the nonionic associative thickener of Example 1.11 at 2 weight % solids, 0.5 weight % Triton™ X-114 surfactant, and various types of salts. The concentration of the added salt and the concentration of the surfactant are based on the total weight of the aqueous dispersion. The aqueous thickener compositions were prepared and tested according to the general procedure for Example 6.1.

TABLE 7.2

Effect of Various Salts and Temperature on the Brookfield Viscosity of Triton ™ X-114 Containing Aqueous Compositions of Example 1.11

| Salt | Concentration (wt %) | Triton ™ X-114 surfactant (wt %) | Brookfield Viscosity (Pa · s) | |
|---|---|---|---|---|
| | | | 25° C. | 45° C. |
| Without salt | 0 | 0.5 | 9.5 | 43 |
| LiCl | 10 | 0.5 | 370 | >1000 |
| NaCl | 10 | 0.5 | 130 | * |
| KCl | 10 | 0.5 | 210 | * |
| $MgCl_2$ | 10 | 0.5 | 930 | >1000 |
| $CaCl_2$ | 10 | 0.5 | 580 | >1000 |
| $BaCl_2$ | 10 | 0.5 | 91 | 380 |
| $ZnCl_2$ | 10 | 0.5 | 57 | 140 |
| $Ca(NO_3)_2$ | 10 | 0.5 | 34 | 180 |
| $AlCl_3$ | 10 | 0.5 | 700 | >1000 |
| $Na_2SO_4$ | 2 | 0.5 | 22 | 63 |
| $Na_2CO_3$ | 2 | 0.5 | 12 | * |
| $NaH_2PO_4$ | 5 | 0.5 | 62 | * |

* Dispersion was not homogeneous.

The results in Table 7.2 show that the addition of the various salts to the aqueous composition of Example 1.11 and surfactant led to increased viscosity at 25° C. and at 45° C.

EXAMPLE 8

Preparation and Testing of Latex Paint Compositions Containing the Nonionic Associative Thickeners

EXAMPLE 8.1

Preparation of Latex Paint Compositions

An unthickened latex paint composition was prepared by combining:

| | |
|---|---|
| Kronos ™ 4311 titanium dioxide slurry | 262.8 g |
| Water | 150.1 g |
| Ethylene glycol | 24.3 g |
| Ropaque ™ Ultra pigment | 49.7 g |
| Rhoplex ™ SG-30 binder | 420.9 g |
| Drewplus ™ L-475 defoamer | 4.0 g |
| 2,2,4-trimethyl-1,3-pentadiol monoisobutyrate (coalescent) | 19.2 g |
| Total weight | 931.0 g |

Kronos ™ 4311 titanium dioxide slurry is a product of Kronos, Incorporated.
Ropaque ™ Ultra pigment and Rhoplex ™ SG-30 binder are products of Rohm and Haas Company, Philadelphia, PA.
Drewplus ™ L-475 defoamer is a product of Ashland Speciality Chemical Company.

EXAMPLE 8.2

The Thickening Efficiencies of the Nonionic Associative Thickeners of Examples 11.1-1,12 in Latex Paint Compositions The nonionic associative thickeners of Examples 1.1 to 1.12 were formulated into the unthickened latex paint composition. The thickening efficiencies of the nonionic associative thickeners in the latex paint as a sole thickener were measured by Stormer viscosity (KU), ICI viscosity, and Brookfield viscosity. Latex paint compositions were prepared for each of the nonionic associative thickeners of Examples 1.1-1.12 by adding the aqueous dispersion, prepared in Example 2, and water to 931 g of the unthickened latex paint composition, and stirring on a lab mixer for ten minutes. Following a 24 hour equilibration period at room temperature, the thickened latex paint compositions were hand stirred before measuring viscosity values. The Brookfield viscosities in Table 3.1 were measured using a Brookfield Viscometer Model DV-II+ (Brookfield Engineering, Inc., Brookfield, Mass.) using a #3 spindle at 6 rpm. The Stormer viscosities in Table 3.1 were measured using a Brookfield KU-1+ Viscometer. The ICI viscosities were measured using an ICI Cone and Plate Viscometer made by Research Equipment (London) Ltd.

Comparative latex paint compositions were prepared with the commercial associative thickener products Acrysol™ RM-5000 thickener and Acrysol™ RM-2020 thickener of the Rohm and Haas Company. These products are urethane. polymers containing alkylene oxide segments formed only from oxyethylene groups.

TABLE 8.1

Viscosities of Latex Paints Formulated with Nonionic Associative Thickener of Examples 1.1-1.12 and Comparative Nonionic Associative Thickeners

| Thickener, % solids | Aqueous Dispersion of Thickener (g) | Dry Thickener (g) | Water (g) | Stormer Viscosity (KU) | ICI Viscosity (Pa·s) | Brookfield Viscosity (Pa·s) |
|---|---|---|---|---|---|---|
| Example 1.1, (16.0%) | 52.5 | 8.4 | 29.5 | 90 | 0.09 | — |
| Example 1.2, (16.0%) | 18.8 | 3.0 | 63.2 | 124 | 0.05 | 156 |
| Example 1.2, (16.0%) | 52.5 | 8.4 | 29.5 | >145 | 0.10 | 69 |
| Example 1.3, (16.0%) | 52.5 | 8.4 | 29.5 | 102 | 0.08 | 3.3 |
| Example 1.4, (16.0%) | 18.8 | 3.0 | 63.2 | 108 | 0.05 | 10 |
| Example 1.4, (16.0%) | 52.5 | 8.4 | 29.5 | >145 | 0.15 | 85 |
| Example 1.5, (6.0%) | 50.0 | 3.0 | 32.0 | 105 | 0.03 | — |
| Example 1.6, (6.0%) | 50.0 | 3.0 | 32.0 | 120 | 0.04 | 12 |
| Example 1.7, (4.0%) | 72.5 | 2.9 | 9.5 | 114 | 0.04 | 16 |
| Example 1.8, (16.0%) | 52.5 | 8.4 | 29.5 | 133 | 0.13 | 20 |
| Example 1.9, (16.0%) | 52.5 | 8.4 | 29.5 | 96 | 0.15 | 2.1 |
| Example 1.10, (4.0%) | 47.5 | 1.9 | 34.5 | 103 | 0.03 | 15 |
| Example 1.11, (6.0%) | 18.8 | 3.0 | 63.2 | 123 | 0.04 | 77 |
| Example 1.12, (16.0%) | 52.5 | 8.4 | 29.5 | 114 | 0.11 | — |
| Acrysol ™ RM-5000 thickener, (18.5%) | 42.0 | 7.8 | 40.0 | 97 | 0.15 | — |
| Acrysol ™ RM-2020 thickener, (20.0%) | 42.0 | 8.4 | 40.0 | 83 | 0.12 | — |

The results in Table 8.1 showed that nonionic associative thickeners of this invention, as exemplified by Examples 1.1 to 1.12, provided thickening of the latex paint composition. The nonionic associative thickeners of Examples 1.2-1.8 and 1.10-12 provided increased thickening efficiency, as measured by Stormer viscosity, compared to the comparative nonionic associative thickeners.

EXAMPLE 8.2

Latex Paint Compositions Formulated with Example 1.1 and Comparative Thickeners

Latex paint compositions were prepared containing the nonionic associative thickener of Example 1.1 as the sole thickener, and in combination with the hydrophobically modified ethoxylate urethane thickener of Comparative B. Also, latex paint compositions were prepared containing comparative Acrysol™ RM-5000 thickener, a nonionic associative thickener containing polyethoxylate chains but not containing polypropylate chains, and with Comparative A. The thickeners were added to the unthickened latex paint composition of Example 8.1.

TABLE 8.2

Latex Paint Compositions Containing Combinations of Example 1.1 and Comparative Hydrophobically Modified Ethoxylated Urethane Thickeners

| Thickeners | Latex Paint Example 8.1 | Latex Paint Example 8.2 | Comparative Latex Paint A | Comparative Latex Paint B |
|---|---|---|---|---|
| Acrysol RM-5000 thickener, 18.5% | — | — | 62.2 g | — |
| Example 1.1, 16.0% | 50.0 g | 50.0 g | — | — |
| Comparative B, 14.0% | — | 25.0 g | — | 25.0 g |
| Water | 32.0 g | 7.0 g | 19.8 g | 57.0 g |
| Stormer Viscosity (KU) | 79 | 98 | 107 | 137 |

The white paints in Table 8.2 were tinted with different levels of colorant and shaken on a paint can shaker for 5 minutes. Table 8.3 summarizes the changes in the Stormer viscosities (KU) upon addition of the colorant. The added colorant was Colortrend™ Line 888 lamp black colorant and phthalo blue (Colortrend is a trademark of Creanova, Inc., Piscataway, N.J.).

TABLE 8.3

Change in Stormer Viscosity (KU) Upon Colorant Additions to the Latex Paints

| Thickeners | Latex Paint Example 8.1 | Latex Paint Example 8.2 | Comparative Latex Paint A | Comparative Latex Paint B |
|---|---|---|---|---|
| 31 ml/l black | −8 | −5 | −10 | −42 |
| 31 ml/l black + 31 ml/l blue | −13 | −7 | −20 | −67 |
| 63 ml/l black + 31 ml/l blue | −18 | −8 | −29 | −85 |

The results in Table 8.3 show that the decreases in the viscosities upon the addition of colorant was 8 KU or less for the latex paints of Examples 8.1 and 8.2. In contrast, the comparative latex paint had viscosity decreases of 10 to 29 KU upon colorant addition. These results indicate that a combination of nonionic associative thickener of this invention and a comparative thickener provided latex paints with improved viscosity stability upon colorant addition.

Latex paint compositions were prepared containing both the nonionic associative thickener of Example 1.1 as the sole thickener, and in combination with Acrysol™ RM-5000 thickener. Also, a comparative latex paint composition was prepared containing comparative Acrysol™ RM-5000 thickener. The thickeners were added to the unthickened latex paint composition of Example 8.1.

TABLE 8.4

Latex Paint Compositions Containing Combinations of Example 1.1 and Comparative Hydrophobically Modified Ethoxylated Urethane Thickeners

| Thickeners | Latex Paint Example 8.3 | Latex Paint Example 8.4 | Comparative Latex Paint C |
|---|---|---|---|
| Acrysol RM-5000 thickener, 18.5% | — | 36.1 | 42.8 g |
| Example 1.1, 16.0% | 53.1 g | 12.5 g | — |
| Water | 28.9 g | 33.4 g | 39.2 g |
| Stormer Viscosity (KU) at 22° C. | 97 | 98 | 100 |
| Stormer Viscosity (KU) at 42° C. | 126 | 99 | 88 |

The results in Table 8.4 show that the latex paints of Examples 8.3 and 8.4, which contain the nonionic associative thickener of this invention, Example 1.1, did not undergo a viscosity drop upon raising the temperature from 22° C. to 42° C. In contrast, Comparative Latex Paint C, which did not contain the nonionic associative thickener of this invention, underwent a viscosity drop of 12 KU units upon raising the temperature from 22° C. to 42° C. Further, the latex paint of Example 8.4, which contained a combination of the nonionic associative thickener of this invention and a comparative nonionic associative thickener, had nearly constant viscosity at temperatures of 22° C. and 42° C.

What is claimed is:

1. A nonionic associative thickener comprising:
   a) a nonionic water soluble polymer backbone comprising a condensation polymer; and
   b) at least two pendant polymeric chains attached to said nonionic water soluble polymer backbone;
   wherein each of said pendant polymeric chains comprise a terminal chain segment selected from:

i) $D\text{-}(L)_n\text{-}(AO)_x\text{-}(L)_n\text{-}$ ii) $D\text{-}(L)_n\text{-}(EO)_q\text{-}(L)_n\text{-}(AO)_x\text{-}(L)_n\text{-}$ or iii) $D\text{-}(L)_n\text{-}co[(AO)_w(EO)_x]\text{-}(AO)\text{-}(L)_n\text{-}$ where:
   D is a hydrophobe comprising from 1 to about 24 carbon atoms;
   L is a urethane-containing or urea-containing linker group;
   EO is an oxyethylene unit;
   AO is an oxyalkylene unit comprising from 3 to 6 carbon atoms;
   $co[(AO)_w(EO)_x]$ is a copolymer comprising said AO and said EO;
   each n is 1;
   w is an integer in the range of from 3 to about 150;
   x is an integer in the range of from 4 to about 150;
   q is an integer in the range of from 1 to about 30;
   z is an integer in the range of from 1 to w;
   q is less than x;
   and wherein said nonionic associative thickener has a weight average molecular weight of at least 10,000.

2. The nonionic associative thickener according to claim 1 wherein said nonionic water soluble polymer backbone is selected from polyurethane polymer, polyether polymer, polysaccharide polymer, polyurea polymer, polyamide polymer, aminoplast-ether polymer, or polyester polymer.

3. The nonionic associative thickener according to claim 1 wherein said AO comprises 3 carbon atoms.

4. The nonionic associative thickener according to claim 1 wherein:
   i) x is in the range of from about 15 to about 50, or
   ii) w is in the range of from about 15 to about 50.

5. The nonionic associative thickener according to one of claims 1 to 4 wherein said hydrophobe is selected from the group consisting of $C_1$ to $C_{18}$ alkyl groups.

6. A composition comprising:
   I) a nonionic associative thickener comprising:
      a) a nonionic water soluble polymer backbone comprising a condensation polymer; and
      b) at least two pendant polymeric chains attached to said nonionic water soluble polymer backbone;
   wherein each of said pendant polymeric chains comprise a terminal chain segment selected from:

i) $D\text{-}(L)_n\text{-}(AO)_x\text{-}(L)_n\text{-}$ ii) $D\text{-}(L)_n\text{-}(EO)_q\text{-}(L)_n\text{-}(AO)_x\text{-}(L)_n\text{-}$ or iii) $D\text{-}(L)_n\text{-}co[(AO)_w(EO)_x]\text{-}(AO)\text{-}(L)_n\text{-}$ where:
   D is a hydrophobe comprising from 1 to about 24 carbon atoms;
   L is a urethane-containing or urea-containing linker group;
   EO is an oxyethylene unit;
   AO is an oxyalkylene unit comprising from 3 to 6 carbon atoms;
   $co[(AO)_x(EO)_x]$ is a copolymer comprising said AO and said EO;

each n is 1;
w is an integer in the range of from 3 to about 150;
x is an integer in the range of from 4 to about 150;
q is an integer in the range of from 1 to about 30;
z is an integer in the range of from 1 to w;
q is less than x;
and wherein said nonionic associative thickener has a weight average molecular weight of at least 10,000; and II) at least one material selected from extender, pigment, or colorant.

7. A method of thickening a composition comprising the step of:
adding a nonionic associative thickener to said composition, wherein said nonionic associative thickener comprises:
a) a nonionic water soluble polymer backbone comprising a condensation polymer; and
b) at least two pendant polymeric chains attached to said nonionic water soluble polymer backbone;
wherein each of said pendant polymeric chains comprise a terminal chain segment selected from:

i) $D\text{-}(L)_n\text{-}(AO)_x\text{-}(L)_n\text{-}$ ii) $D\text{-}(L)_n\text{-}(EO)_q\text{-}(L)_n\text{-}(AO)_x\text{-}(L)_n\text{-}$ or iii) $D\text{-}(L)_n\text{-}co[(AO)_w(EO)_x]\text{-}(AO)\text{-}(L)_n\text{-}$ where:
D is a hydrophobe comprising from 1 to about 24 carbon atoms;
L is a urethane-containing or urea-containing linker group;
EO is an oxyethylene unit;
AO is an oxyalkylene unit comprising from 3 to 6 carbon atoms;
$co[(AO)_w(EO)_x]$ is a copolymer comprising said AO and said EO;
each n is 1;
w is an integer in the range of from 3 to about 150;
x is an integer in the range of from 4 to about 150;
q is an integer in the range of from 1 to about 30;
z is an integer in the range of from 1 to w;
q is less than x;
and wherein said nonionic associative thickener has a weight average molecular weight of at least 10,000.

8. The method according to claim 7 wherein said composition is an aqueous composition.

9. The method according to claim 8, wherein said aqueous composition further comprises polymer particles.

10. The method according to one of claims 7 to 9, further comprising the step of adding a cothickener, wherein said cothickener is a diphobe, triphobe, or quadraphobe associative thickener with a weight average molecular weight that is at least about 0.5 mass units less than said weight average molecular weight of said nonionic associative thickener.

* * * * *